United States Patent
Gong

(10) Patent No.: US 11,055,543 B2
(45) Date of Patent: Jul. 6, 2021

(54) ROAD CURVATURE GENERATION IN REAL-WORLD IMAGES AS A METHOD OF DATA AUGMENTATION

(71) Applicants: VOLKSWAGEN AG, Wolfsburg (DE); AUDI AG, Ingolstadt (DE); PORSCHE AG, Stuttgart (DE)

(72) Inventor: Xinwei Gong, Mountain View, CA (US)

(73) Assignees: Volkswagen AG; Audi AG; Porsche AG

( * ) Notice: Subject to any disclaimer, the term of this patent is extended or adjusted under 35 U.S.C. 154(b) by 124 days.

(21) Appl. No.: 16/523,269

(22) Filed: Jul. 26, 2019

(65) Prior Publication Data

US 2021/0027071 A1 Jan. 28, 2021

(51) Int. Cl.
| | |
|---|---|
| *G06K 9/00* | (2006.01) |
| *G06T 7/33* | (2017.01) |
| *G05D 1/00* | (2006.01) |
| *G06K 9/62* | (2006.01) |

(52) U.S. Cl.
CPC ....... *G06K 9/00798* (2013.01); *G05D 1/0088* (2013.01); *G06K 9/6256* (2013.01); *G06T 7/33* (2017.01); *G05D 2201/0213* (2013.01); *G06T 2207/20081* (2013.01); *G06T 2207/30256* (2013.01)

(58) Field of Classification Search
CPC .... G06K 9/00798; G06K 9/6256; G06T 7/33; G06T 2207/30256; G06T 2207/20081; G05D 1/0088; G05D 2201/0213
See application file for complete search history.

(56) References Cited

U.S. PATENT DOCUMENTS

| | | | |
|---|---|---|---|
| 10,223,614 B1 | 3/2019 | Kim et al. | |
| 2017/0248971 A1* | 8/2017 | Wei | G05D 1/0094 |
| 2018/0238696 A1* | 8/2018 | Takeda | B60W 30/095 |
| 2020/0097738 A1* | 3/2020 | Aragon | G06T 7/80 |

FOREIGN PATENT DOCUMENTS

WO 2008130233 A1 10/2008

OTHER PUBLICATIONS

Muñoz-Bulnes et al.; Deep Fully Convolutional Networks with Random Data Augmentation for Enhanced Generalization in Road Detection; IEEE 20th International Conference on Intelligent Transportation Systems (ITSC); Oct. 16, 2017; pp. 366-371.
Zhang; End-to-end Learning for Autonomous Driving; PhD Thesis; Department of Computer Science; New York Univerissy; May 2019.
Search Report and Written Opinion for International Patent Application No. PCT/EP2020/070813; dated Oct. 26, 2020.

* cited by examiner

*Primary Examiner* — Dhaval V Patel
(74) *Attorney, Agent, or Firm* — Barnes & Thornburg LLP

(57) ABSTRACT

Disclosed embodiments provide systems and methods for transforming real-world images for augmentation of image data for improvement of training data sets utilized by machine learning algorithms to provide autonomous and/or assistive driving functionality.

26 Claims, 4 Drawing Sheets

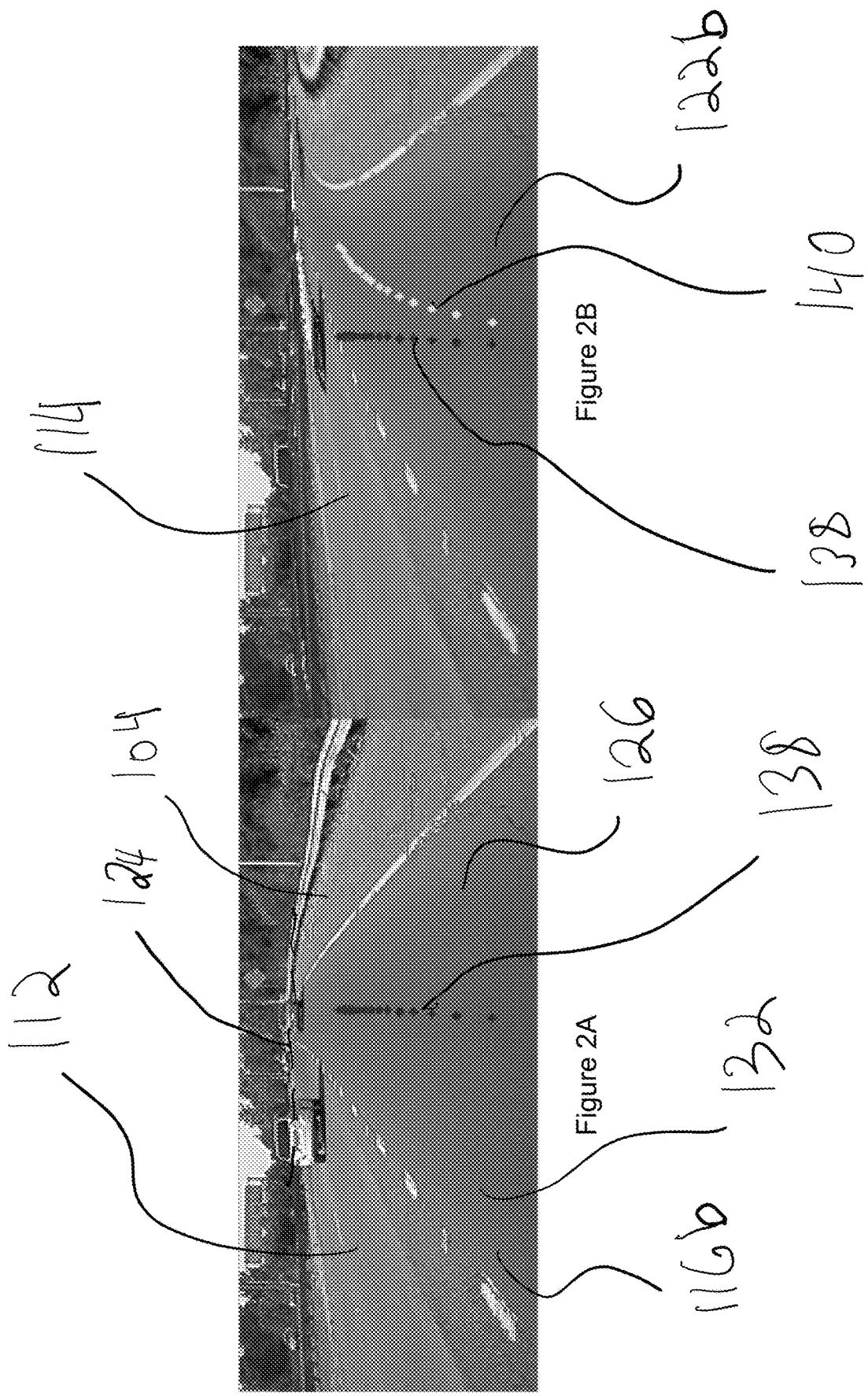

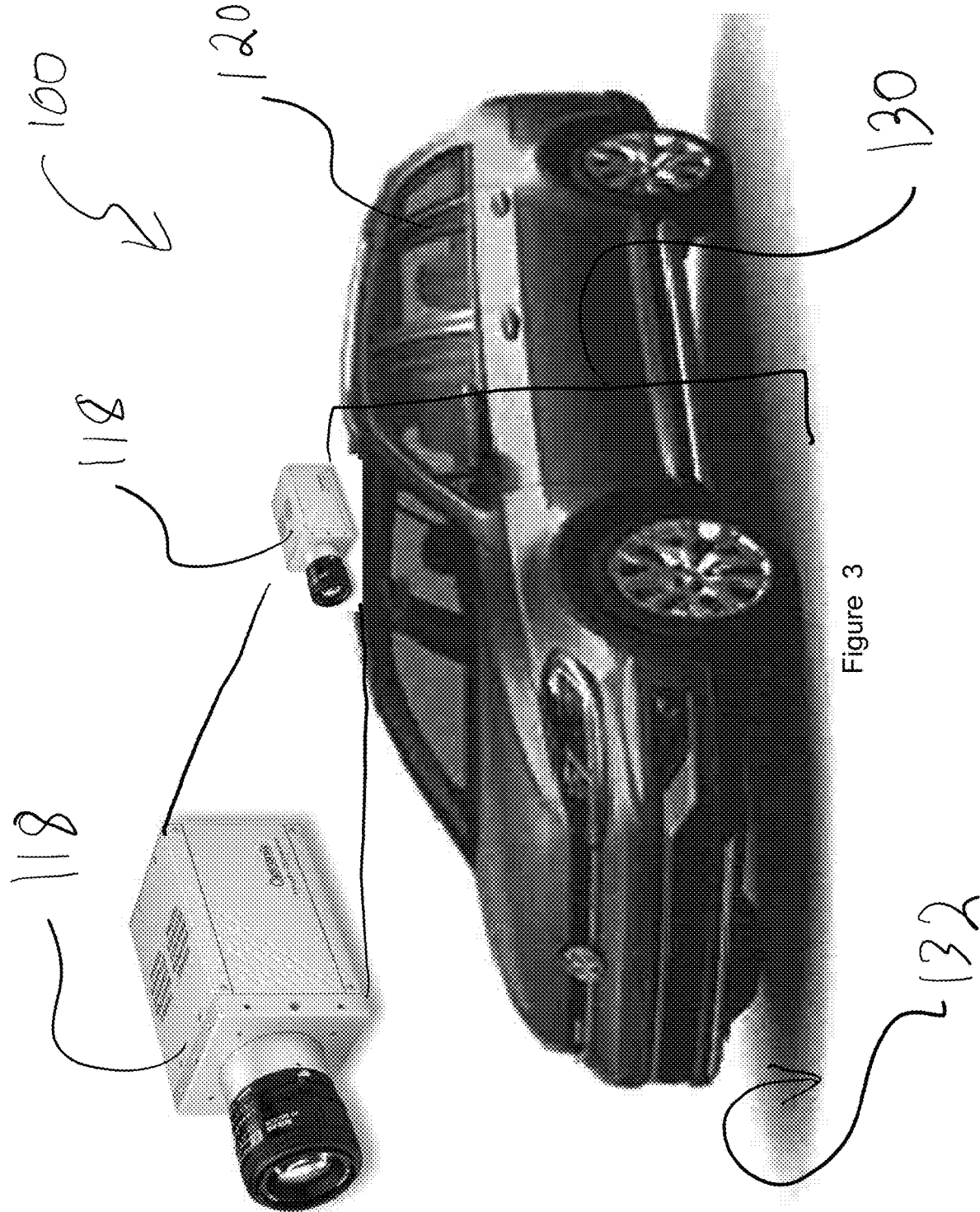

ROAD CURVATURE GENERATION IN REAL-WORLD IMAGES AS A METHOD OF DATA AUGMENTATION

CROSS-REFERENCE TO RELATED APPLICATIONS

None

FIELD

Disclosed embodiments relate to method operations and equipment for use in transforming real-world images for augmentation of image data.

SUMMARY

In accordance with disclosed embodiments, systems, components, and methodologies are provided to improve training data sets utilized by machine learning algorithms to provide autonomous and/or assistive driving functionality.

In accordance with at least some disclosed embodiments, systems, components and methodologies, real-world data is augmented with synthetic data generated from the real-world data. Disclosed embodiments provide systems and methods for transforming real-world images for augmentation of image data for improvement of training data sets utilized by machine learning algorithms to provide autonomous and/or assistive driving functionality.

Additional features of the disclosed embodiments will become apparent to those skilled in the art upon consideration of disclosure provided herein.

BRIEF DESCRIPTION OF THE FIGURES

The detailed description particularly refers to the accompanying figures in which:

FIGS. 2A and 2B illustrate an example of highway images for training of machine learning algorithms with vehicle paths superimposed thereon in accordance with disclosed embodiments.

FIG. 3 illustrates an example of a system and constituent components for performing original image data acquisition and transformation of the original data in accordance with the present disclosure.

DETAILED DESCRIPTION

Figures 1A, 1B:
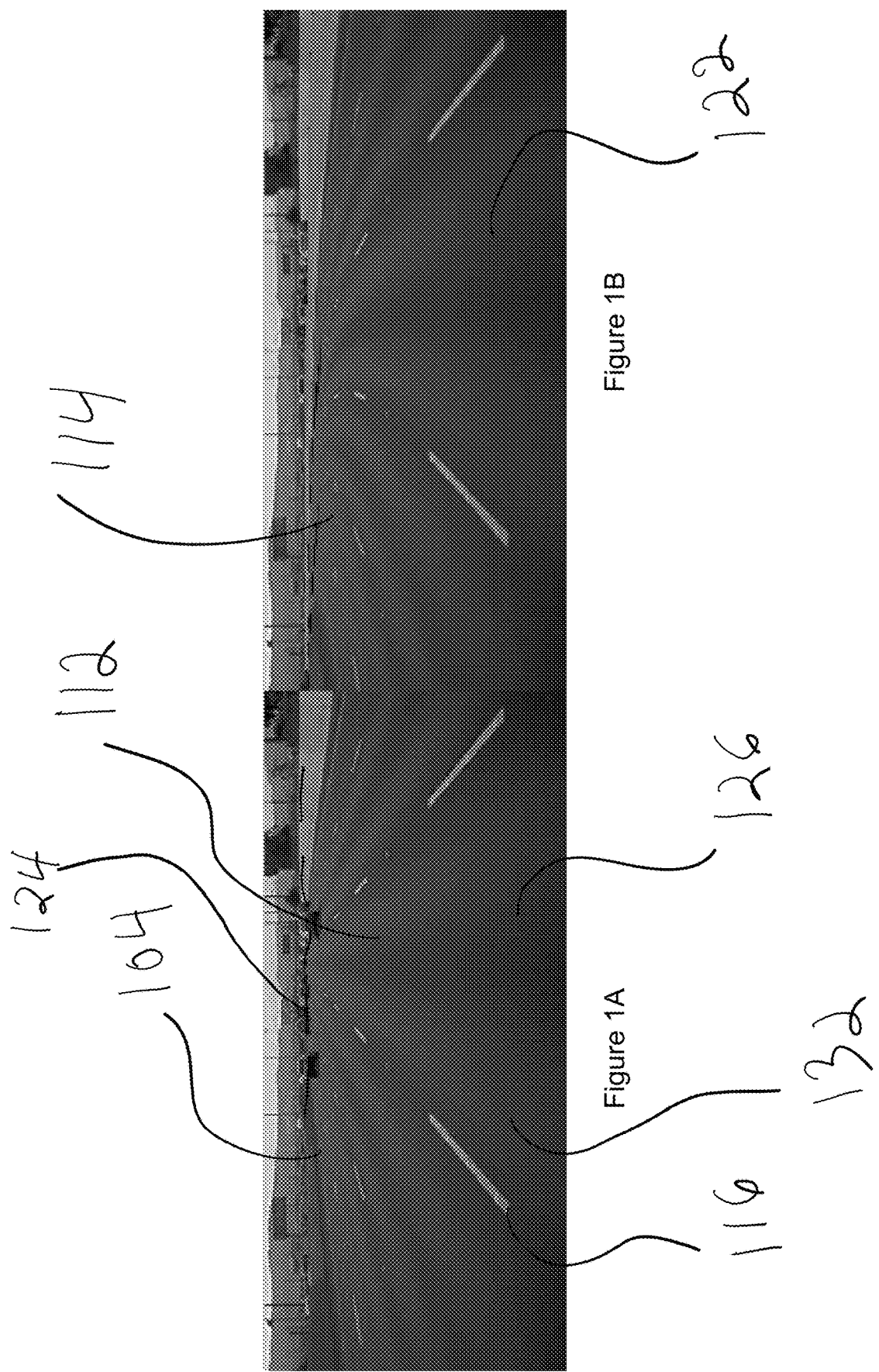
FIGS. 1A and 1B illustrate examples of highway images for training of machine learning algorithms that facilitate autonomous and/or assistive driving functionality in accordance with disclosed embodiments.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Machine learning algorithms, often used in connection with autonomous transportation vehicles, call for large quantities of data when developing models by which autonomous and/or assistive driving functionality is performed. The large quantities of data used during development of these models should be diverse and balanced, but it is frequently expensive to acquire this type of data from real-world data gathering.

Disclosed embodiments provide a technical solution for improving a data imbalance problem for training machine learning models using data collected on roadways, particularly controlled access highways and the like. For example, often, highways and like roadways, include a proportionally greater quantity of straight roadway.

For the purpose of this disclosure, the term "roadway" includes any road, thoroughfare, route, or way on land between two places that has been paved or otherwise improved to allow travel by a transportation vehicle including, but not limited to, a motor vehicle or other transportation vehicle including one or more wheels. Thus, it should be understood that such roadways may include one or more lanes and junctions with other roadways including on/off ramps, merge areas, etc., that may be included in parkways, avenues, boulevards, freeways, tollways, interstates, highways, or primary, secondary, or tertiary local roads.

Thus, the term "highway," as it is used herein refers to a specific subset of roadways that typically include long stretches of straight roadway in greater proportion to curved or arcuate roadway. An exemplary highway, as contemplated by this disclosure, is a controlled access highway or autobahn. Therefore, the term "roadway" inclusively refers to "highways" in this disclosure.

For the purposes of this disclosure, the term "on-road localization" is used to refer to the ability to determine a position of the transportation vehicle relative to the roadway, or a portion of a roadway such as a lane, on which the transportation vehicle is travelling.

With the further incorporation of autonomous and driver assistance-related transportation vehicle technologies, it is envisioned that, in implementation, autonomous and/or assistive functionality will rely at least partially, and potentially fully, on on-road localization performed in an automated or semi-automated manner based on Global Positioning Service (GPS) data, data generated by a plurality of sensors located on-vehicle, and machine learning algorithms and/or neural networks operatively coupled to the plurality of sensors and/or GPS for processing and interpreting such data to facilitate on-road localization. As explained below, various conventional approaches are known for developing and training machine learning models to execute on-road localization using various different types of sensors and various different types of training data sets. However, each of these approaches has deficiencies with regard to the quality/amount of data to be acquired and/or processed during build-up of the machine learning model(s) for real-world use in real-time to safely control transportation vehicle travel.

For the purposes of this disclosure, the phrase "autonomous and/or assistive functionality" refers to functionality that enables the partial, full, or complete automation of vehicular control ranging and encompassing what has presently come to be known as the five levels of driving automation. Thus, it should be understood that autonomous and/or assistive functionality refers to operations performed by a vehicle in an automated manner by on-vehicle equipment or the output of alerts, prompts, recommendations, and/or directions to a user, wherein these outputs are generated in an automated manner by on-vehicle equipment. Moreover, autonomous and/or assistive functionality may include driver assistance functionality (level one) wherein on-vehicle equipment assists with, but does not control, steering, braking and/or acceleration, but a driver ultimately controls accelerating, braking, and monitoring of a vehicle surroundings.

It should be understood, therefore, that such autonomous and/or assistive functionality may also include lane departure warning systems which provide a mechanism to warn a driver when a transportation vehicle begins to move out of its lane (unless a turn signal is on in that direction) on freeways and arterial roads. Such systems may include those that warn the driver (Lane Departure Warning) in response to the vehicle is leaving its lane (visual, audible, and/or vibration warnings) and, if no action is taken, automatically take operations to ensure the vehicle stays in its lane (Lane Keeping System).

Likewise, autonomous and/or assistive functionality may include partial automation (level two), wherein the transportation vehicle assists on steering or acceleration functions and correspondingly monitoring vehicle surroundings to enable a driver to disengage from some tasks for driving the transportation vehicle. As understood in the automotive industry, partial automation still requires a driver to be ready to assume all tasks for transportation vehicle operation and also to continuously monitor the vehicle surroundings at all times.

Autonomous and/or assistive functionality may include conditional automation (level three), wherein the transportation vehicle equipment is responsible for monitoring the vehicle surroundings and controls steering, braking, and acceleration of the vehicle without driver intervention. It should be understood that, at this level and above, the on-vehicle equipment for performing autonomous and/or assistive functionality will be interfacing with or include navigational functionality so that the components have data to determine where the vehicle is to travel. At level three and above, a driver is theoretically permitted to disengage from monitoring vehicle surroundings but may be prompted to take control of the transportation vehicle operation under certain circumstances that may preclude safe operation in a conditional automation mode.

Thus, it should be understood that autonomous and/or assistive functionality may include systems that take over steering and/or maintain the transportation vehicle relatively centered in the lane of traffic.

Likewise, autonomous and/or assistive functionality may include high automation (level four) and complete automation (level five), wherein on-vehicle equipment enable automated steering, braking, and accelerating, in response to monitoring of the surroundings of the vehicle in an automated manner without driver intervention.

Therefore, it should be understood that autonomous and/or assistive functionality may require monitoring of surroundings of a vehicle including the vehicle roadway as well as identification of objects in the surroundings so as to enable safe operation of the vehicle in response to traffic events and navigational directions, wherein that safe operation requires determining when to change lanes, when to change directions, when to change roadways (exit/enter roadways), when and in what order to merge or traverse a roadway junction, and when to use turn signals and other navigational indicators to ensure other vehicles/vehicle drivers are aware of upcoming vehicle maneuvers.

Further, it should be understood that high and full automation may include analysis and consideration of data provided from off-vehicle sources in order to make determinations of whether such levels of automation are safe. For example, autonomous and/or assistive functionality at such levels may involve determining the likelihood of pedestrians in the surroundings of a transportation vehicle, which may involve referencing data indicating whether a present roadway is a highway or parkway. Additionally, autonomous and/or assistive functionality at such levels may involve accessing data indicating whether there is a traffic jam on the present roadway.

Conventional transportation vehicle navigation systems, as well as, conventional autonomous vehicles use GPS technology for their on-road localization. However, a deficiency of conventional use of global localization using GPS is that localization is limited to a certain level of accuracy, more specifically 5-10 meters in the best case (which typically requires a geographical area that provides an unobstructed, open view to the sky). Moreover, lower accuracy is much more likely in geographical areas that include relatively large buildings, trees, or geographic contours such as canyons. This is because GPS based location services require signals from GPS satellites. Dense materials, for example, rock, steel, etc.), tall buildings, and large geographical terrain features may block or degrade GPS signals.

Therefore, GPS has been conventionally combined with local landmarks for on-road localization, for example, lane markings to improve the ability for a vehicle with autonomous and/or assistive vehicle functionality to accurately perform on-road localization. Conventionally, these local landmarks have been detected and identified from camera images or sensor data from other sensors obtained by one or more cameras/sensors located on-vehicle. For example, it has been conventionally discussed to combine GPS data with data collected from front view cameras and LiDAR, and, even data generated by ground penetration radar. In addition, it has been discussed that there is utility for such cameras to extract a reduced feature presentation of roadway characteristics from on-vehicle cameras to generate data indicating roadside patterns that may be analyzed to perform on-road localization. Machine learning algorithms, and models developed thereby, facilitate the combination and operational utilization of the various data inputs, including camera images, to provide autonomous and/or assistive functionality.

Disclosed embodiments are based on a recognition that recent autonomous vehicle traffic accidents provide evidence that there is a technical and real-world need to increase the robustness and/or reliability of machine learning models that govern autonomous and/or assistive functionality; particularly, in scenarios that occur less frequently and/or require more significant reactionary measures from the systems enabling the autonomous and/or assistive functionality and controlling travel of transportation vehicles.

Furthermore, autonomous and/or assistive functionality often leverages machine learning models. Generally, development of autonomous and/or assistive functionality may take one of two different approaches. A first approach emphasizes the input of modular systems (e.g., a sensor fusion module, a scene understanding module, a dynamics prediction module, a path planning module, and a control module). A second approach is an end-to-end methodology whereby sensory data may be mapped directly to control signals at the instruction of a computer algorithm.

Machine learning may be heavily utilized in both the first and second approaches. Machine learning models are trained with a dataset that may be referred to as "training data". The ability and operational value of machine learning algorithms is indirectly affected by the quality and quantity of the training data. Still further, the training data must be gathered or generated, dependent upon numerous considerations and comparisons associated with the availability and expense of both the generation and collection of particular data subsets of the training data. In exemplary machine learning models, real-world data is gathered for training. Further, in accordance with this example of a machine learning system underpinning autonomous and/or assistive functionality of transportation vehicles, training data may be collected by sensors mounted in test vehicles driven by test drivers for extended periods of time.

Machine learning models may be built and trained with the goal of facilitating operation thereof, in this case autonomous and/or assistive functionality, with all types of inputs spanning an input domain of the model (e.g., all roadway circumstances and conditions). For a simplified, but analogous, example, if a machine learning algorithm is aimed at detecting dogs in pictures, then the algorithm aims to be able to detect all breeds of dogs. However, dog breeds may be quite visually different from one another. Thus, to develop the machine learning algorithm adequately, such that all dogs are recognized, the training data should be well balanced and diverse. Referring still to a hypothetical dog detecting algorithm, the implication for the training data is that roughly equal proportions of images of all dog breeds should be present therein in order to build a robust machine learning model.

Thus, regarding autonomous and/or assistive functionality during highway driving, a data imbalance problem within training data sets presents multiple challenges. First, most segments of highway are either straight or very slightly curvy, and only a small fraction thereof include considerable curvature. Therefore, a machine learning algorithm trained with unfiltered and/or unaltered data collected from extended periods of highway driving will have been overtrained on straightaways and under-trained on curved road segments. As a result, a transportation vehicle utilizing autonomous and/or assistive functionality relying on this example machine learning model would likely perform poorly on arcuate highway segments, while still not realizing significant improvement over a baseline in performance on straightaway highway segments.

Described with reference to FIGS. 1-4, systems and methods of training data transformation address natural imbalances in training data gathered for training a machine learning algorithm utilized in the performance of autonomous and/or assistive functionality.

Conventionally, two strategies are available for addressing the presence of a data imbalance between straight highway/roadway data 104 and curved highway/roadway data within a training data set. First, a machine learning algorithm may be trained by a simulation. During simulation, the proportion of straightaway and curved road segments experienced along the simulated highway may be balanced as desirable. In other words, the entire body of training data may be customized. This approach may represent significant expense. For example, teams of engineers and artists are needed to build a simulator that mimics real-world highway driving, and the mileage and scenery diversity specification for the training data would add to the cost of any developed simulator.

It may be useful, instead, to generate diverse roadway data without developing a simulator. Still further, machine learning models trained with simulated data may not necessarily perform well in the real world. Simulated data, however realistic looking, may be simply not the same as real-world data. There is no a priori guarantee that this simulated approach would produce a robust machine learning model.

In contrast, in accordance with disclosed embodiments, systems and methodologies may generate synthetic data that is more photorealistic and more adaptable to real-world problems because the disclosed embodiments draw from real-world data.

However, when training with real-world data gathered by driving along highways is desired, then a portion of the straight highway data may be removed from the training data set to develop a more diverse training data set according to conventional approaches. Similarly, the curved highway data may be artificially replicated, perhaps numerous times, until the training data set comprises a desired ratio of the straight highway data to the curved highway data. This approach also has disadvantages because removing data is wasteful. Data collection is expensive. Removing a portion of straight road driving data is removes a relatively large portion of all data collected. Alternatively, repeating the curved road data numerous times such the amount thereof matches the straight road data results in decreased within-category diversity in the curved road data. Machine learning algorithms thrive models are develop with diversity and balance of training data. Artificially replicating one type of data to achieve data type balance may solve the data imbalance problem, but such actions create another data imbalance problem (e.g., that one category of training data is much more diverse than another category). This may result in the algorithm performing better with one type of input than another.

In accordance with disclosed embodiments, and as illustrated in FIGS. 1A-1B, straight highway data 104 may comprise data describing one or more straight highway segments 112, and the curved highway data comprises data describing one or more curved highway segments 114 in addition to other transformed image data. Accordingly, systems and methods configured in accordance with disclosed embodiments may generate new data in the curved highway segment category and may bring that category to the same level of diversity as the straight highway segment category.

Systems and/or methodologies of the presently disclosed embodiments may transform images of the one or more straight highway segments 112 into images of one or more synthetic curved highway segments 114 with computer vision algorithms and/or processes.

FIG. 1A depicts an original image 116 of an example one of the straight highway segment(s) 112 captured by a camera 118 (see FIG. 3) mounted to a transportation vehicle 120 (e.g., a car, once again, see FIG. 3). FIG. 1B depicts a transformed arcuate image 122 of an example of the one or more synthetic curved highway segments 114. In the transformed image 122 of FIG. 1B, the original image 116 (FIG. 1A) is modified such that the roadway shown therein is imparted a curvature of 1/300 meters. Hereinafter, the term "curvature" is meant to refer to the reciprocal of radius such that a smaller curvature implies a larger radius, relatively.

In FIG. 1B, a curvature of 1/300 m indicates that the illustrated example of one of the synthetic curved highway segment(s) 114 comprises a radius of 300 meter, should the segment of roadway be extended to complete a circle.

Figure 4:
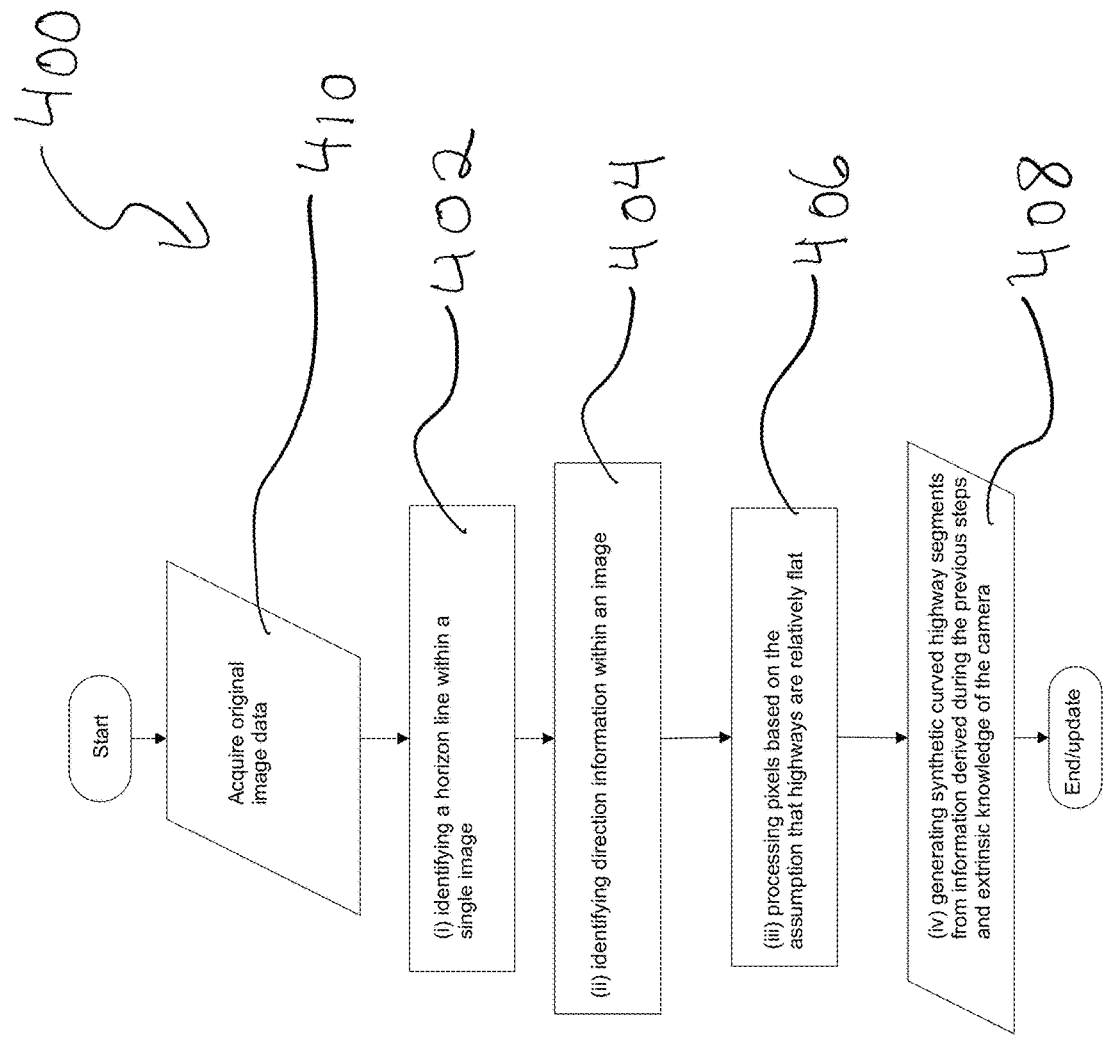
FIG. 4 illustrates the operation of performing image data acquisition and transforming for development of augmented training data sets for training of machine learning algorithms in accordance with the present disclosure.

In accordance with disclosed embodiments and shown in FIG. 4, a method 400 for transforming the straight highway image 116 into the transformed arcuate image 122 may include: (i) identifying a horizon line 402; (ii) identifying direction information 404; (iii) processing pixels based on the assumption that highways are relatively flat 406; and (iv) generating synthetic curved highway segments 408 from information derived during the previous operations and extrinsic knowledge of the camera used during a data gathering operation 410.

As illustrated in FIG. 3, and as part of identifying a horizon line, first, the original, straight highway images 116 may be acquired by a camera 118 disposed on or within the transportation vehicle 120. A line of horizon 124 may be identified within the image(s). Numerous horizon detection algorithms may be utilized to assist in identifying the horizon line 124 shown in FIGS. 1A-2B. Thereafter, a plurality of pixels 126 disposed below the horizon line 124 may be identified as corresponding to the straight highway segment 112. Thus, disclosed embodiments contemplate approximating that all pixels below the horizon line 124 represent the straight highway segment 112. Also, in accordance with disclosed embodiments, additional techniques, such as identifying roadway lines, may be utilized to increase the accuracy of a region of pixels belonging to the roadway.

Subsequently, camera model and camera parameters adhered to during image collection may be used to inform an operation of transforming each of the highway pixels 126 to a light ray vector described by camera coordinates. This is information described in image space, wherein each of the light ray vectors indicates a direction associated with a portion of the straight highway segment 112 imaged by the individual pixel. The direction of each of the light ray vectors may be indicated relative to the camera 118 but need not supply distance information. If an example camera has a 60-degree field of view, then it is possible to infer that the direction of an object is, for example, about 30 degrees to the left of the forward direction. However, a 2D image does not impart to a viewer information on how far away the hypothetical object is disposed. To extend this example, the object may be small and nearby, or the object may be relatively large and very far away. Thus, which one of these possibilities represents reality is not discernable from a 2D image alone.

As noted above, the original straight highway images 116 may be analyzed to reveal the direction of each of the highway pixels 126, and highways tend to be relatively flat. Furthermore, a vertical distance 130 of the camera 118 from a surface 132 of the highway is a known parameter of the extrinsic parameters of the camera model that facilitated collection of the original images 116. The extrinsic parameters define the location and orientation of the camera with respect to the real-world frame of reference. Extrinsic camera parameters may further include relative position and orientation of the camera with respect to the real-world and/or the subject (e.g., the roadway). Intrinsic parameters of the camera may also be important for data gathering and analysis as described herein and may include parameters internal and fixed to a particular camera/digitization setup. Intrinsic parameters allow a mapping between camera coordinates and pixel coordinates in the image frame and may include optical, geometric, and digital characteristics of the camera. Thus, this information informs an assumption that all the colors in the highway pixels 126 come from a shared flat plane orthogonal to a vertical line connecting the camera 118 and the roadway surface 132. As a result, direction information for each of the highway pixels 126 may be combined with the presence of each of the pixels 126 on the flat plane at a known vertical distance 130 from the camera 118. This combination of information may be processed to determine a location on the flat plane for each of the highway pixels 126. Accordingly, with the addition of distance, the highway pixels 126 may be described mathematically with spatial coordinates in physical space.

Once location information is determined for each of the highway pixels 126, a curvature transformation may be applied to each point on the flat plane to develop a curved plane. Thereafter, the same camera model and extrinsic parameters previously leveraged to determine the light ray vector(s) for each of the highway pixels 126 may inform re-transformation of the curved plane back into image space (e.g., camera coordinates). Accordingly, the transformed arcuate image 122 of the one or more synthetic curved highway segments 114 may be generated.

Systems and methodologies provided in accordance with the disclosed embodiments may be utilized to perform training data transformation that results in blocks of black (or empty) pixels. Color and image data originally present at image space corners of the highway pixels 126 may be shifted left or right dependent upon the curvature applied during transformation. As a result, corners of images of the one or more synthetic curved highway segments 114 may appear without color information. The presence of black or colorless corners is not desirable because the machine learning algorithm may be trained to identify the empty pixels as indicative of curvature, thereby decreasing the effectiveness of the synthetic curved highway segments 114 within a training data set. The presence of colorless pixels may be addressed by retaining the original colors at the image space location of the otherwise black pixels.

Systems and methodologies provided in accordance with the disclosed embodiments may utilize techniques from both the machine learning and computer vision fields. Further, systems and methodologies provided in accordance with the disclosed embodiments may utilize an assumption unique to the data collection method; specifically, disclosed embodiments may operate based on an assumption that the colors present at image pixels belonging to a roadway may be treated as reflected off of the same flat plane. Thus, the curvature transformation process may then be performed in a spatial coordinates system and a mapping between pixel coordinates and spatial coordinates may produce usable images for supplementing a training data set. Further, the operation of covering black/colorless pixels caused by the curvature transformation process with the original colors (e.g., retaining the original color information even after same information is spatially transformed away from the original locations thereof) may, optionally, further improve the quality of the training data set.

Systems and methodologies provided in accordance with the disclosed embodiments may be useful for developing autonomous and/or assistive functionality, such as when a neural network predicts a path of a vehicle across approximately the next 30 meters for every image. In particular, the systems and methodologies provided in accordance with the disclosed embodiments may generate images of one or more synthetic curved highway segments 114 for augmenting the quantity of curved highway segments present in a gathered training data set. It is notable that transforming a training image to add a certain curvature may be desirably coupled with transforming data associated with the training image.

For example, when a vehicle path is associated with the training image undergoing transformation, the corresponding vehicle path may be transformed to reflect the same curvature. Thus, the vehicle path information may still follow the highway and/or a lane therein for the next 30 meters for autonomous and/or assistive functionality. When curvature is added to an image without transforming the corresponding vehicle path, the original path will likely cross lanes or otherwise incongruously indicate the vehicle path for the synthetic curved highway segments 114. This data augmentation technique may improve the accuracy and stability of a neural network model used to achieve autonomous and/or assistive functionality.

Referring now to FIGS. 2A and 2B, an original image 116b and a transformed arcuate image 122b are depicted. FIG. 2A is the original image 116b of an exemplary one of the relatively straight highway segments 112 taken by the camera 118 mounted on the transportation vehicle 120. A first set of dots 138 indicates an actual path taken by the driver over an upcoming 30 meters from the time the original image 116b was captured. Referring now to FIG. 2B, the transformed arcuate image 122b is shown after transformation imparts a high negative curvature (e.g., curving to the right) to the highway segment. In FIG. 2B, a second set of dots 140 indicates a new path transformed to correspond with the curvature imparted to the highway segment that a driver should take to maintain lane position on the synthetic curved highway segment 114 of the transformed arcuate image 122b. The second set of dots 140 of the curved path is obtained by applying the same curvature transformation as is applied to the highway segment. FIG. 2B further compares the first and second sets of dots 138, 140 respectively representing the actual driven path and a path reflecting appropriate adjustment to fit the highway segment of the transformed arcuate image 122b.

Optionally, in addition, supervised learning, which is the most common form of machine learning, involves enabling learning during a training phase based on a set of training data so as to enable the ability to learn to recognize how to label input data for categorization. Deep learning improves upon the supervised learning approach by considering several levels of representation, in which every level uses the information from a previous level to learn more deeply. Deeper architectures of many stacked layers is one aspect, also Convolutional Neural Networks (CNNs) take into account 2D/3D local neighborhood relations in pixel/voxel space by convolution over spatial filters.

Supervised deep learning involves the application of multiple levels, or phases, of functional operations to improve understanding of resulting data then fed into further functional operations. For example, supervised deep learning for classification of data into one or more categories may be performed, for example, by performing feature learning (involving one or more phases of convolutions, Rectifier Linear Units (ReLUs) and pooling) to enable subsequent classification of sample data to identify learned features by application of a softmax function to enable differentiation between objects and background in the input image data. These operations may be performed to generate image class labels for classification purposes.

Likewise, supervised deep learning operations may be performed for regression by operating in parallel on Red Green Blue (RGB) image and distance to ground/disparity map data by performing multiple convolutions and joining the result through concatenation for subsequent processing. These operations may be performed to generate image regression labels for subsequent use in analysis.

Moreover, supervised deep learning operations may be performed for semantic segmentation by inputting RGB image data into a convolutional encoder/decoder that may include multiple stages of convolution, batch normalization (which does not only apply to segmentation but applies to other networks as well), ReLUs and pooling, followed multiple phases of convolution, batch normalization and ReLUs with upsampling. The resulting data may then be processed by application of a softmax function to provide output data with segmentation labelling for each pixel. Thus, disclosed systems and methodologies for transforming image data may preserve real-world information for successful application of the above-outlined techniques.

Further, it should be understood that, although the disclosed embodiments may be utilized for the purposes of facilitating robust autonomous and/or assistive transportation vehicle functionality generally, the disclosed embodiments may have particular utility in providing that functionality when lane markings are obscured as a result of weather conditions such as snow. In such conditions, lane markings and roadside patterns conventionally used to assist in on-road localization are obscured. For example, snow of any amount can obscure lane markings and road signs; additionally, snow of a large amount can alter the appearance of surroundings along a roadway to the point that roadside patterns cannot be analyzed to provide additional data to be combined with GPS analysis for performing on-road localization.

In this regard, it should be understood that at least one embodiment may include a feedback mechanism that determines the quantity and/or quality of data produced and/or analyzed in the disclosed operations. Such a feedback mechanism may be used to selectively increase or decrease a reliance on the transformed image(s) 122 in provisioning autonomous and/or assistive functionality. This may be implemented, for example, by dynamically weighting data that has or has not undergone transformation. It should also be understood that such a feedback mechanism may include comparison with threshold values for maintaining at least minimum parameters to ensure safety for autonomous and/or assistive functionality operation.

Further it should be understood that a mechanism for dynamically weighting such data may be performed in one or more of various conventionally known techniques that enable Sensor Data Fusion, for example, using a Kalman Filter, processing performed based on the central limit theorem, Bayesian networks, the Dempster-Shafer theorem, CNNs or any of the other mathematical operations disclosed herein.

As explained above, disclosed embodiments may be implemented in conjunction with components of autonomous and/or assistive driving systems included in transportation vehicles. Thus, the utility of the disclosed embodiments within those technical contexts has been described in detail. However, the scope of the innovative concepts disclosed herein is not limited to those technical contexts.

Additionally, it should be understood that the presently disclosed means for analyzing image data depicting a roadway on which the transportation vehicle may comprise any combination of the sensors and functionality disclosed herein implemented in hardware and/or software to provide the disclosed functionality.

Moreover, it should be understood that such assistive technology may include but is not limited to what may have been conventionally termed a Driver Assistance System (DAS) or an Advanced Driver Assistance System (ADAS) implemented using hardware and software included in a transportation vehicle. These conventionally known systems assist the driver in decision and control, but inevitably the decisions and control are the responsibility of the driver. Further, these systems can be either "active" or "passive" in how they are implemented. Active DAS means that the vehicle itself controls various longitudinal and/or lateral aspects of the vehicle's driving behavior, or rather, very specific driving tasks, through its sensors, algorithms, processing systems, and actuators. Passive DAS means that the vehicle will simply assist the driver, through its sensors, algorithms, processing systems, and Human-Machine Interfaces (HMIs) with controlling various longitudinal and/or lateral aspects of vehicle control. For example, in a collision avoidance situation an active system would bring the vehicle to a stop or route the vehicle around the obstacle in the immediate path. A passive system would provide some type of visual, auditory, and haptic cues to the driver to stop or route the vehicle around the obstacle.

Thus, a DAS system helps the driver with many tasks ingrained into the driving process and implemented specifically for the purpose to increase car and road safety, as well as driver convenience. Such DAS systems include, but are not limited to cruise control, Adaptive Cruise Control (ACC), active steering for lane keeping, lane change assistance, highway merge assistance, collision mitigation and avoidance systems, pedestrian protection systems, automated and/or assistive parking, sign recognition, blind spot detection for collision mitigation, and stop and go traffic assistance. Accordingly, the disclosed embodiments provide additional and potentially more accurate data to such DAS systems to provide this assistive functionality.

It should further be understood that disclosed embodiments utilize functionality from multiple different technological fields to provide an additional mechanism and methodologies developing training data sets to facilitate autonomous and/or assistive driving functionality by combining analysis performed in computer vision and machine learning.

While the functionality of the disclosed embodiments and the system components used to provide that functionality have been discussed with reference to specific terminology that denotes the function to be provided, it should be understand that, in implementation, the component functionality may be provided, at least in part, components present and known to be included in conventional transportation vehicles.

For example, as discussed above, disclosed embodiments use software for performing functionality to enable measurement and analysis of data, at least in part, using software code stored on one or more non-transitory computer readable mediums running on one or more processors in a transportation vehicle. Such software and processors may be combined to constitute at least one controller coupled to other components of the transportation vehicle to support and provide autonomous and/or assistive transportation vehicle functionality in conjunction with vehicle navigation systems, and multiple sensors. Such components may be coupled with the at least one controller for communication and control via a CANbus of the transportation vehicle. It should be understood that such controllers may be configured to perform the functionality disclosed herein.

It should further be understood that the presently disclosed embodiments may be implemented using dedicated or shared hardware included in a transportation vehicle. Therefore, components of the module may be used by other components of a transportation vehicle to provide vehicle functionality without departing from the scope of the invention.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements referred to above may be intended to include the plural forms, unless the context indicates otherwise. The method processes, and operations described herein are not to be construed as necessarily requiring their performance in the particular order discussed or illustrated, unless specifically identified as an order of performance or a particular order is inherently necessary for embodiment to be operational. It is also to be understood that additional or alternative operations may be employed.

Disclosed embodiments include the methods described herein and their equivalents, non-transitory computer readable media programmed to carry out the methods and a computer system configured to carry out the methods. Further, included is a vehicle comprising components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory. Additionally, embodiment functionality may be implemented using embedded devices and online connection to cloud computing infrastructure available through radio connection (e.g., wireless communication) with such infrastructure. The training data sets, image data, and/or transformed image data may be stored in one or more memory module of the memory coupled to the one or more processors.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The embodiment(s) detailed hereinabove may be combined in full or in part, with any alternative embodiment(s) described.

The invention claimed is:

1. Transportation vehicle equipment for developing transformed training data, the equipment comprising:
at least one processor;
at least one sensor;
at least one memory module, wherein the transportation vehicle equipment gathers image data;

wherein the image data depicts a roadway and is stored on the at least one memory module;

wherein the at least one processor analyzes the image data, to detect a horizon line and direction information for pixels representing the roadway, and wherein the image data is generated using the at least one sensor; and means for analyzing the image data that transforms the image data depicting the roadway into transformed image data depicting an arcuate roadway, and means for developing a training data set for training a machine learning algorithm with the transformed image data.

2. The transportation vehicle equipment of claim 1, wherein means for training trains at least a part of an autonomous and/or assistive driving system for operating the transportation vehicle to travel on the roadway.

3. The transportation vehicle equipment of claim 2, wherein the means for developing the training data set for training the machine learning algorithm replaces a portion of the image data with the transformed image data.

4. The transportation vehicle equipment of claim 3, wherein the transformed image data represents synthetic curved roadway segments.

5. The transportation vehicle equipment of claim 1, wherein the at least one sensor is a camera disposed on the transportation vehicle and communicatively coupled with the means for analyzing the image data.

6. The transportation vehicle equipment of claim 5, wherein the camera comprises predetermined extrinsic parameters.

7. The transportation vehicle equipment of claim 5, wherein the means for analyzing image data transforms the direction information for pixels representing the roadway from image coordinates to spatial coordinates.

8. The transportation vehicle equipment of claim 7, wherein the means for analyzing image data determines a flat plane based on a vertical distance of the camera from the roadway.

9. The transportation vehicle equipment of claim 8, wherein the means for analyzing image data determines that the pixels disposed on the flat plane indicate a surface of the roadway.

10. The transportation vehicle equipment of claim 9, wherein the means for analyzing image data determines distance information for the pixels indicating the surface of the roadway.

11. The transportation vehicle equipment of claim 10, wherein the means for analyzing image data applies a curvature to the pixels indicating the surface of the roadway.

12. A method of image transformation for training a machine learning algorithm, the method comprising:

analyzing, by a processor, image data stored in a memory and depicting a roadway acquired by one or more data gathering transportation vehicles to detect a horizon line and direction information for pixels representing the roadway, wherein the image data is generated using at least one sensor mounted to the one or more data gathering transportation vehicles;

transforming the image data depicting the roadway into transformed image data depicting an arcuate roadway; and developing a training data set for training a machine learning algorithm with the transformed image data.

13. The method of image transformation of claim 12, further comprising providing autonomous and/or assistive functionality for operating a transportation vehicle to travel on the roadway, which includes transforming a vehicle path corresponding to the transformed image data.

14. The method of image transformation of claim 13, wherein the operation of providing autonomous and/or assistive functionality for operating the transportation vehicle to travel on the roadway further includes replacing a portion of the image data with the transformed image data.

15. The method of image transformation of claim 14, wherein the transformed image data represents synthetic curved roadway segments.

16. The method of image transformation of claim 12, wherein the at least one sensor is a camera disposed on the transportation vehicle and communicatively coupled with the processor and memory.

17. The method of image transformation of claim 16, wherein the camera comprises predetermined extrinsic parameters.

18. The method of image transformation of claim 12, further comprising transforming the direction information for pixels representing the roadway from image coordinates to spatial coordinates.

19. The method of image transformation of claim 18, further comprising determining a flat plane based on a vertical distance of the camera from the roadway.

20. The method of image transformation of claim 19, further comprising determining that the pixels disposed on the flat plane indicate a surface of the roadway.

21. The method of image transformation of claim 20, further comprising determining distance information for the pixels indicating the surface of the roadway.

22. The method of image transformation of claim 21, further comprising applying a curvature to the pixels indicating the surface of the roadway.

23. The method of image transformation of claim 22, further comprising retaining original color information in the image coordinated for pixels moved in the spatial coordinates during the transforming operation.

24. A non-transitory, machine readable medium including machine readable software code, which, when executed on a processor, controls a method of image transformation for training a machine learning algorithm, the method comprising:

analyzing image data depicting a roadway gathered by a transportation vehicle to detect a horizon line and direction information for pixels representing the roadway, wherein the image data is generated using at least one sensor mounted to the transportation vehicle;

transforming the image data depicting the roadway into transformed image data depicting an arcuate roadway; and developing a training data set for training a machine learning algorithm with the transformed image data.

25. The non-transitory, machine readable medium including machine readable software code of claim 24, which, when executed on a processor, controls a method of image transformation for training a machine learning algorithm, the method comprising:

training the machine learning algorithm with a portion of the image data and the transformed image data.

26. The non-transitory, machine readable medium including machine readable software code of claim 24, which, when executed on a processor, controls a method of image transformation for training a machine learning algorithm, the method comprising:

executing the machine learning algorithm to provide autonomous and/or assistive functionality for operating a transportation vehicle to travel on the roadway.

\* \* \* \* \*